(12) United States Patent
Duleba et al.

(10) Patent No.: US 9,420,426 B2
(45) Date of Patent: Aug. 16, 2016

(54) INFERRING A CURRENT LOCATION BASED ON A USER LOCATION HISTORY

(71) Applicant: Google Inc., Mountain View, CA (US)

(72) Inventors: Krzysztof Duleba, Pfaffikon (CH); Lukasz Andrzej Heldt, Stallikon (CH); Ankit Gupta, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/329,086

(22) Filed: Jul. 11, 2014

(65) Prior Publication Data

US 2015/0038162 A1 Feb. 5, 2015

Related U.S. Application Data

(60) Provisional application No. 61/860,143, filed on Jul. 30, 2013.

(51) Int. Cl.
*H04W 24/00* (2009.01)
*H04W 4/02* (2009.01)

(52) U.S. Cl.
CPC ..................... *H04W 4/028* (2013.01)

(58) Field of Classification Search
CPC ...... H04L 65/403; H04L 67/18; G06Q 10/10; G06Q 30/0242; G06Q 30/0269; H04W 4/02; H04W 4/206; H04W 4/028
USPC ...................................... 455/456.1
See application file for complete search history.

(56) References Cited

U.S. PATENT DOCUMENTS

| | | | |
|---|---|---|---|
| 8,301,639 B1 | 10/2012 | Myllymaki | |
| 2007/0264968 A1* | 11/2007 | Frank | G06Q 30/02 455/404.2 |
| 2010/0287178 A1 | 11/2010 | Lambert et al. | |
| 2011/0029474 A1* | 2/2011 | Lin | G06N 5/04 706/50 |
| 2011/0077862 A1 | 3/2011 | Huang et al. | |
| 2013/0013620 A1 | 1/2013 | Rolf et al. | |
| 2013/0185355 A1 | 7/2013 | Tseng et al. | |
| 2013/0267251 A1* | 10/2013 | Khorashadi | H04W 4/023 455/456.3 |
| 2014/0045523 A1* | 2/2014 | Singh | H04W 4/021 455/456.1 |
| 2014/0324964 A1* | 10/2014 | Anand | H04L 67/22 709/204 |

OTHER PUBLICATIONS

International Search Report for PCT/US14/46589 mailed Jun. 10, 2015—2 pages.

* cited by examiner

*Primary Examiner* — Timothy Pham
(74) *Attorney, Agent, or Firm* — Dority & Manning, P.A.

(57) ABSTRACT

Systems and methods for inferring a current location of a user or device based on an analysis of a user location history are provided. In particular, when the current location of a device requesting a location-enhanced service cannot be determined with sufficient precision, a plurality of historical locations provided by the user location history can be scored according to a variety of parameters. The historical location receiving the highest score can be inferred to be the current location of the user, permitting the requested location-enhanced service to be performed.

12 Claims, 4 Drawing Sheets

INFERRING A CURRENT LOCATION BASED ON A USER LOCATION HISTORY

PRIORITY CLAIM

The present application claims the benefit of priority of U.S. Provisional Patent Application Ser. No. 61/860,143, titled Systems and Methods for Inferring a Current Location Based on a User Location History, filed Jul. 30, 2013, which is incorporated herein by reference for all purposes.

FIELD

The present disclosure relates generally to providing location-enhanced services. In particular, the present disclosure relates to systems and methods for inferring a current location of a user or device based on an analysis of a user location history.

BACKGROUND

Location-enhanced services are increasingly common online tools used by many people on a daily basis. In particular, location-enhanced services use knowledge of a user's location to provide an online service in a more accurate or useful manner. For example, a search engine can use knowledge of a user's location to tailor search results to reflect the most accurate or useful information for such location. As another example, when the user's location is known, a mapping application or geographic information system can provide a superior map in response to a point of interest search or a request for directions. Therefore, knowledge of a user's location is increasingly a key factor used to provide a superior online experience across a broad range of services or tools.

In the context of a traditional desktop computer, methods for determining user location are fairly established and successful. For example, geolocation by analysis of internet protocol (IP) address is a common technique which yields generally useful results.

However, in the context of mobile computing, such as, for example, a smartphone, existing systems and methods for determining a user location are much less suitable. In particular, users of mobile computing devices have high expectations regarding the ability of the computing device and its corresponding communication system to geolocate. For example, many users of smartphones consistently employ their devices to act as navigational devices or to provide real-time, location-enhanced search results when hunting for a local point of interest, such as a restaurant, hotel, or other meeting place.

Some methods of geolocation for mobile computing devices are relatively precise. For example, successful use of the global positioning system or a Wi-Fi positioning system can result in a precise location for the mobile computing device. Unfortunately, such positioning systems are simply not available or operational for a large amount of time or locations. Further, geolocation by analysis of IP address is generally not as informative for mobile device carrier IPs. In addition, requiring the user to manually correct the query by appending the desired location is slow, cumbersome, and undesirable for the user.

The above problems result in a significant amount of time in which a precise location for a mobile computing device is not available or otherwise known. Thus, without knowledge of the device's location, service providers struggle to provide location-enhanced services, resulting in user frustration and loss of optimal functionality.

SUMMARY

One aspect of the present disclosure is directed to a computer-implemented method for determining a current location of a client device. The method includes obtaining, by one or more computing devices, a user location history having a plurality of entries. Each entry identifies a location, a time, and one of a plurality of device identifiers. The method includes receiving, by the one or more computing devices, a request for a location-enhanced service from the client device. The method includes identifying, by the one or more computing devices for each of the plurality of device identifiers, the entry having the most recent time. The method includes determining, by the one or more computing devices, a score for each of the identified entries using a scoring formula. The method includes selecting, by the one or more computing devices, the location of the entry having the highest score as the current location of the client device.

Another aspect of the present disclosure is directed to one or more server computing devices. The one or more server computing devices include one or more processors and one or more non-transitory computer-readable media storing instructions that, when executed by the one or more processors, cause the one or more server computing devices to perform operations. The operations include maintaining a user location history having a plurality of entries respectively associated with a plurality of devices associated with a user account. Each entry provides a time and a location. The operations include receiving a communication from a first device, the first device being one of the plurality of devices. The operations include determining whether the most recent of the plurality of entries associated with the first device provides a time that is within a threshold amount from a current time. When the time provided by the most recent of the plurality of entries associated with the first device is within the threshold amount from the current time, the operations include selecting as a current location of the first device the location provided by the most recent of the plurality of entries associated with the first device. When the time provided by the most recent of the plurality of entries associated with the first device is not within the threshold amount from the current time, the operations include scoring the most recent entry associated with each of the plurality of devices using a scoring formula and selecting as the current location of the first device the location provided by the entry receiving the highest score.

Another aspect of the present disclosure is directed to one or more non-transitory computer-readable media storing instructions that, when executed by one or more processors, cause the one or more processors to perform operations. The operations include determining a score for each of a plurality of candidate locations respectively associated with a plurality of device identifiers associated with a user account. The operations include selecting the candidate location having the highest score as a current location of a client device. The score for each candidate location is based at least in part on a co-location factor exhibited between a pair of device location histories respectively associated with the client device and the device identifier associated with the candidate location being scored.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling description of the present disclosure, including the best mode thereof, directed to one of ordinary skill in the art, is set forth in the specification, which makes reference to the appended figures, in which.

DETAILED DESCRIPTION

Overview

Figure 1:
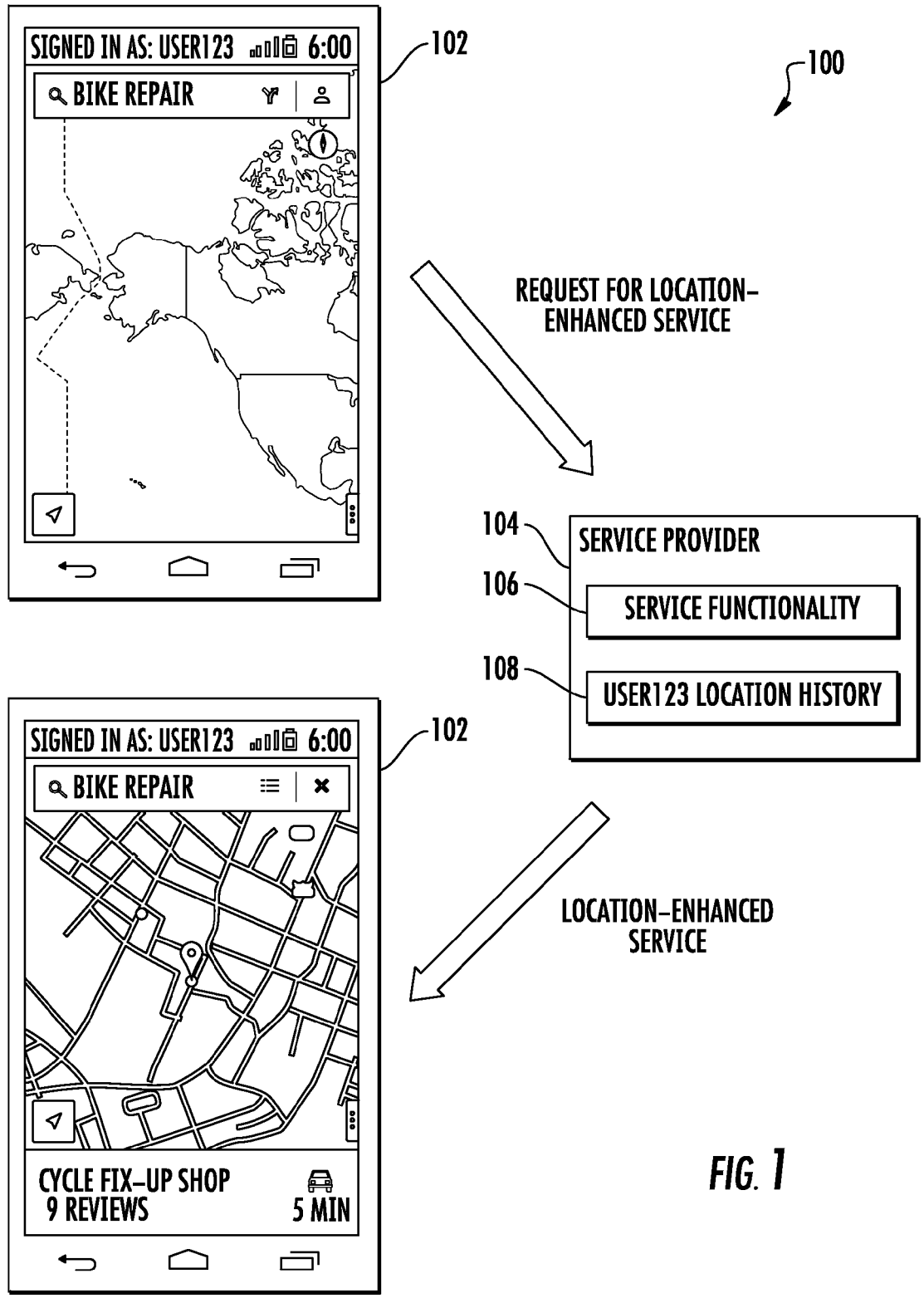
FIG. 1 depicts a graphical diagram of a client device requesting and receiving a location-enhanced service from a service provider according to an example embodiment of the present disclosure.

The present disclosure is directed to systems and methods for inferring a current location of a user or device based on an analysis of a user location history. As an example, when the current location of a device requesting a location-enhanced service cannot be determined with sufficient precision, a plurality of historical locations provided by the user location history can be scored according to a variety of parameters. The historical location receiving the highest score can be inferred to be the current location of the user.

More particularly, a user location history can be generated and maintained for the user. The user location history can be defined by a user account associated with the user and can store one or more entries for each instance in which a device that is signed into or otherwise associated with such user account performs an online interaction or reports its location. Each entry can describe a location and time and can provide a device identifier corresponding to the particular device used at such location and time.

Thus, in some embodiments, in order to obtain the benefits of the techniques described herein, the user may be required to allow the collection and analysis of personal information, such as location information or device identity information. Therefore, in some embodiments, users may be provided with an opportunity to control whether programs or features collect such information. If the user does not allow collection and use of such information, then the user may not receive the benefits of the techniques described herein. In some embodiments, the user can also be provided with tools to revoke or modify consent. In addition, certain information or data can be treated in one or more ways before it is stored or used, so that personally identifiable information is removed.

When a request for a location-enhanced service is received from a device signed into the user account, it can first be determined whether a current location of such device can be determined with sufficient precision. For example, a number of various geolocation techniques can be performed. Alternatively, if a location has been freshly determined for such device (e.g. within the last 5 minutes), then such freshly determined location can be used. However, if the precise location of the device cannot be determined and a fresh location is not available, then the user location history can be analyzed to assist in inferring the current location of such device.

In particular, a plurality of entries can be obtained from the user location history. For example, the most recent entry for each unique device identifier can be obtained. As another example, a particular number of the most recent entries regardless of device identifier can be obtained. As yet another example, a mix of entries can be obtained that includes the most recent entries in addition to at least one entry per unique device identifier.

Each of the obtained entries can be scored according to a scoring formula. As an example, the scoring formula can provide a score to the entry based at least in part on its age, a location consistency, and a device co-location factor. Other parameters or components can be included as well.

The location consistency can compare the location provided by the entry being scored to a coarse location obtained by, for example, geolocating an IP address from which the request for the location-enhanced service was received.

The device co-location factor can provide an indication of how often the two devices have historically been at the same place at the same time. For example, the device co-location factor can compare some or all historical locations and times associated with the device identifier provided by the entry being scored with some or all historical locations and times associated with the device identifier of the device from which the request was received.

Once each of the obtained entries has been scored, the location provided by the entry that received the highest score can be selected as the current location of the device from which the request was received. Such selected location can then be used to provide the requested location-enhanced service. Thus, location-enhanced services can be effectively provided even in instances in which a current location of the device is generally unobtainable with sufficient precision according to known techniques.

With reference now to the FIGS., example embodiments of the present disclosure will now be discussed in detail.

Example Location-Enhanced Service

FIG. 1 depicts a graphical diagram 100 of a client device 102 requesting and receiving a location-enhanced service from a service provider 104 according to an example embodiment of the present disclosure.

A location-enhanced service can include any service provided to a client device by host server in which knowledge of the client device's location is used to enhance or adjust one or more aspects of the provided service. Example location-enhanced services include, but are not limited to, identifying, filtering, or promoting web search results based on device location; providing location-specific maps or directions; identifying, filtering, or promoting point of interest search results in a mapping application or geographic information system based on device location; identifying, filtering, or promoting content or advertisements based on device location; providing personal assistant functionality by organizing and selecting for presentation information available from a range of data sources based on device location; modifying operations of an arbitrary web-service based on device location; or any other suitable location-enhanced service, including aspects of web-based email, social networking, news or other content aggregation, or other suitable services or products.

As shown in FIG. 1, example client device 102 has been used to sign into a user account ("User123"). As used herein, a user account can be any account or means of identification that is associated with a user of one or more services. Example user accounts include an operating system account; an account used for purchasing and ownership of content from a content distribution platform; a web-based email account; a social media account; a financial services account; a game account; an application-specific account (e.g. a news aggregator account or an internet-radio application account); or any other suitable user account.

In one implementation, service provider 104 offers several of the services discussed above (e.g. web-based email, social media, gaming, and content distribution) and a single user account can be used to participate in, receive, or otherwise control aspects of each of such services from service provider 104.

As an example, as shown in FIG. 1, example client device 102 can implement an application module to operate a mapping application. In particular, the user has entered a point of interest search query of "bike repair." By pressing or selecting an "Enter" key, a "Go" icon, or the magnifying glass icon the user can send the search query to service provider 104.

Thus, client device 102 can request a service from service provider 104 (e.g. a point of interest search in a mapping application). Further, the requested service could be enhanced using knowledge of current location of client device 102. In particular, by identifying and presenting point of interest search results in a general vicinity of a current location of the client device 102, the point of interest search service can be improved.

However, as an example, assume that the entered search query has not provided any information to determine a desired location of the point of interest. Furthermore, the current viewpoint provided by the mapping application is significantly broad such that a desired location of the point of interest cannot be inferred from such viewpoint.

Further assume for the purposes of the present example that a current location of client device 102 cannot be determined with sufficient precision. For example, the request for the location-enhanced service can fail to identify the current location of client device 102 and other geolocation techniques such as GPS or WiFi positioning can be unavailable.

According to aspects of the present disclosure, service provider 104 can analyze a user location history 108 associated with User123 to infer the current location of the client device 102. Service provider 104 can then use such inferred current location in conjunction with service functionality 106 to provide the location-enhanced service to client device 102.

In particular, as shown in FIG. 1, although the current location of client device 102 was unable to be determined with sufficient precision using traditional geolocation techniques such as GPS, the location-enhanced service (e.g. location-specific point of interest search results) was still able to be provided to client device 102 by service provider 104.

Example Systems

Figure 2:
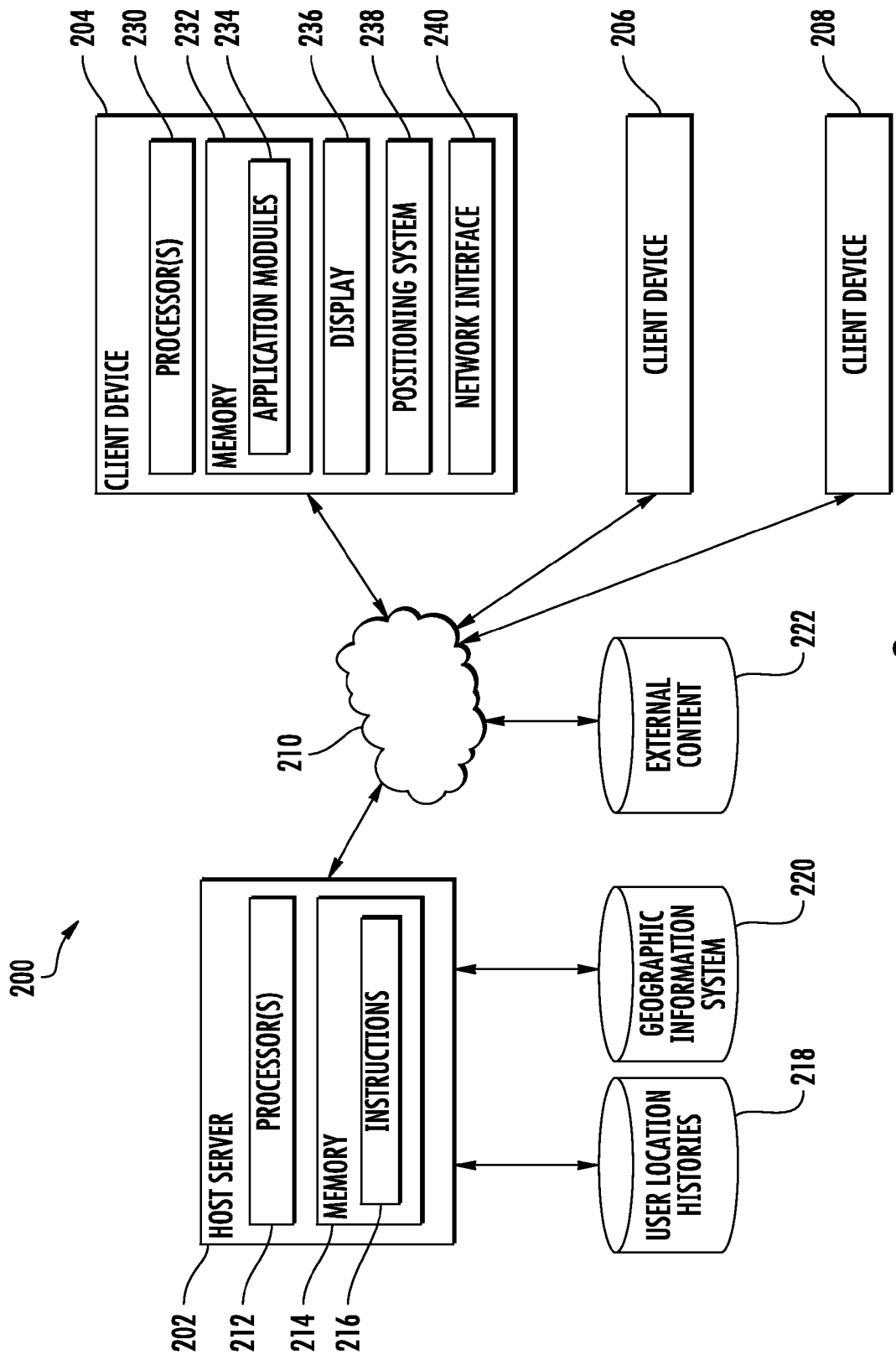
FIG. 2 depicts an example system according to an example embodiment of the present disclosure.

FIG. 2 depicts an example system 200 according to an example embodiment of the present disclosure. System 200 can include a client-server architecture, where a host server 202 communicates with one or more client devices 204, 206, and 208 over a network 210. Although three client devices 204, 206, and 208 are illustrated in FIG. 2, any number of client devices can be connected to host server 202 over network 210.

Client devices 204, 206, and 208 can be, for example, a computing device having a processor 230 and a memory 232, such as a wireless mobile device, a personal digital assistant (PDA), smartphone, tablet, navigation system located in a vehicle, handheld GPS system, laptop computer, desktop computer, computing-enabled watch, computing-enabled eyeglasses, gaming console, embedded computing system, home appliances, or other such devices/systems. In short, client device 204 can be any computer, device, or system that can interact with the host server system 202 (sending and receiving data).

Processor 230 of client device 204 can be any suitable processing device and can be one processor or a plurality of processors that are operably connected. Memory 232 can include any number of computer-readable instructions or other stored data. In particular, memory 232 can include, store, or provide one or more application modules 234. When implemented by processor 230, application modules 234 can respectively cause or instruct processor 230 to perform operations consistent with the present disclosure, such as, for example, running an application that transmits location data to host server 202 in addition to performing any number of arbitrary operations. Application modules 234 can include, for example, a mapping application or a browser application.

The term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example, computer executable instructions that are stored in a tangible computer-readable storage medium such as RAM hard disk or optical or magnetic media.

Client device 204 can further include a positioning system 238. Positioning system 238 can determine a current geographic location of client device 204 and communicate such geographic location to host server 202 over network 210. The positioning system 238 can be any device or circuitry for analyzing the position of the client device 204. For example, the positioning system 238 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

In the instance in which the user consents to the use of positional or location data, the positioning system 238 can analyze the position of the client device 204 as the user moves around in the world and provides the user location information to the host server 202 over network 210. As will be discussed further later, each of such location updates can be used to build a user location history for a user account associated with client device 204.

Client device 204 can further include a network interface 240. Network interface 240 can include any suitable components for interfacing with one more networks, including for example, transmitters, receivers, ports, controllers, antennas, or other suitable components.

Host server 202 can be implemented using one or more suitable computing devices and can include a processor 212 and a memory 214. In the instance in which host server 202 is implemented using a plurality of computing devices, such devices can be configured according to a parallel computing architecture, a sequential computing architecture, or a combination of such architectures.

Processor 212 can be any suitable processing device and can be one processor or a plurality of processors which are operably connected. Memory 214 can store instructions 216 that cause processor 212 to perform operations to implement the present disclosure. Host server can communicate with client device 204 over network 210 by sending and receiving data.

Network 210 can be any type of communications network, such as a local area network (e.g., intranet), wide area network (e.g., Internet), or some combination thereof and can include any number of wired or wireless links. In general, communication between the host server 202 and a client device 204 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL). Preferably, however, client device 204 can freely move throughout the world and communicate with host server 202 is a wireless fashion.

Host server 202 can be coupled to or in communication with one or more databases, including a database providing an index of user location histories 218, a geographic information system 220, and external content 222. Although databases 218, 220, and 222 are depicted in FIG. 2 as external to host server 202, one or more of such databases can be included in memory 214 of host server 202. Further, databases 218, 220, and 222 can each correspond to a plurality of databases rather than a single data source.

According to an aspect of the present disclosure, user location histories database 218 can store or provide a plurality of user location histories respectively associated with a plurality of user accounts.

In particular, when a user elects to participate and has signed into her user account with respect to one or more of client devices 204, 206, and 208, then such client device can periodically send a location update to host server 202 over network 210. For example, each location update can identify the presently active user account and a unique device identifier that corresponds to the device providing the update. Each location update can further include a location (e.g. latitude and longitude) and a timestamp identifying the date and time of day. In some implementations, location updates can further include an accuracy indicator and/or other identifying information such as an originating IP address.

Thus, in some embodiments, in order to obtain the benefits of the techniques described herein, the user may be required to allow the collection and analysis of personal information, such as location information or device identity information. Therefore, in some embodiments, users may be provided with an opportunity to control whether programs or features collect such information. If the user does not allow collection and use of such information, then the user may not receive the benefits of the techniques described herein. In some embodiments, the user can also be provided with tools to revoke or modify consent. In addition, certain information or data can be treated in one or more ways before it is stored or used, so that personally identifiable information is removed.

The device identifiers used in the user location histories can be any suitable means of identifying particular client devices. For example, example device identifiers include, but are not limited to, manufacturer serial number; MAC address; a device platform string (e.g. Operating System/Device Manufacturer/Device Model/Operational Parameters); IP address; an ID code provided from device memory; or any other suitable device identifier.

Additional information can be used to build or supplement a user location history as well. As an example, whenever a user is logged into a user account and performs a web search or uses one or more applications, such as a mapping application, it is possible that such interaction can result in obtaining the user's location. Therefore, an entry identifying such location can be formed in the associated user location history based on such interaction.

All received location updates are stored and keyed by user account so that a user location history is built over time. Thus, in some embodiments, the user location history for each user account can consist of an encrypted set of location history entries. The set of location history entries for each user location history can be sorted by device identifier and other parameters.

As user location histories can include a large amount of data over time, in some embodiments, a sub-history can be maintained for each user location history in some implementations. The sub-history can provide the single most recent location per each device or device identifier.

Geographic information system 220 can store or provide geospatial data to be used by host server 202. Example geospatial data includes geographic imagery (e.g., digital maps, satellite images, aerial photographs, street-level photographs, synthetic models, etc.), tables, vector data (e.g. vector representations of roads, parcels, buildings, etc.), point of interest data, or other suitable geospatial data. Geographic information system 220 can be used by host server 202 to provide navigational directions, perform location-specific point of interest searches, or any other suitable use or task required or beneficial for providing location-enhanced services.

Computer based system 200 can further include external content 222. External content 222 can be any form of external content including news articles, webpages, video files, audio files, written descriptions, ratings, game content, social media content, photographs, commercial offers, or other suitable external content. Host server system 202 and client device 204 can access external content 222 over network 210. External content 222 can be searched by host server 202 according to known searching methods and can be ranked according to relevance, popularity, or other suitable attributes, including location-specific filtering or promotion.

Example Methods

Figure 3A:
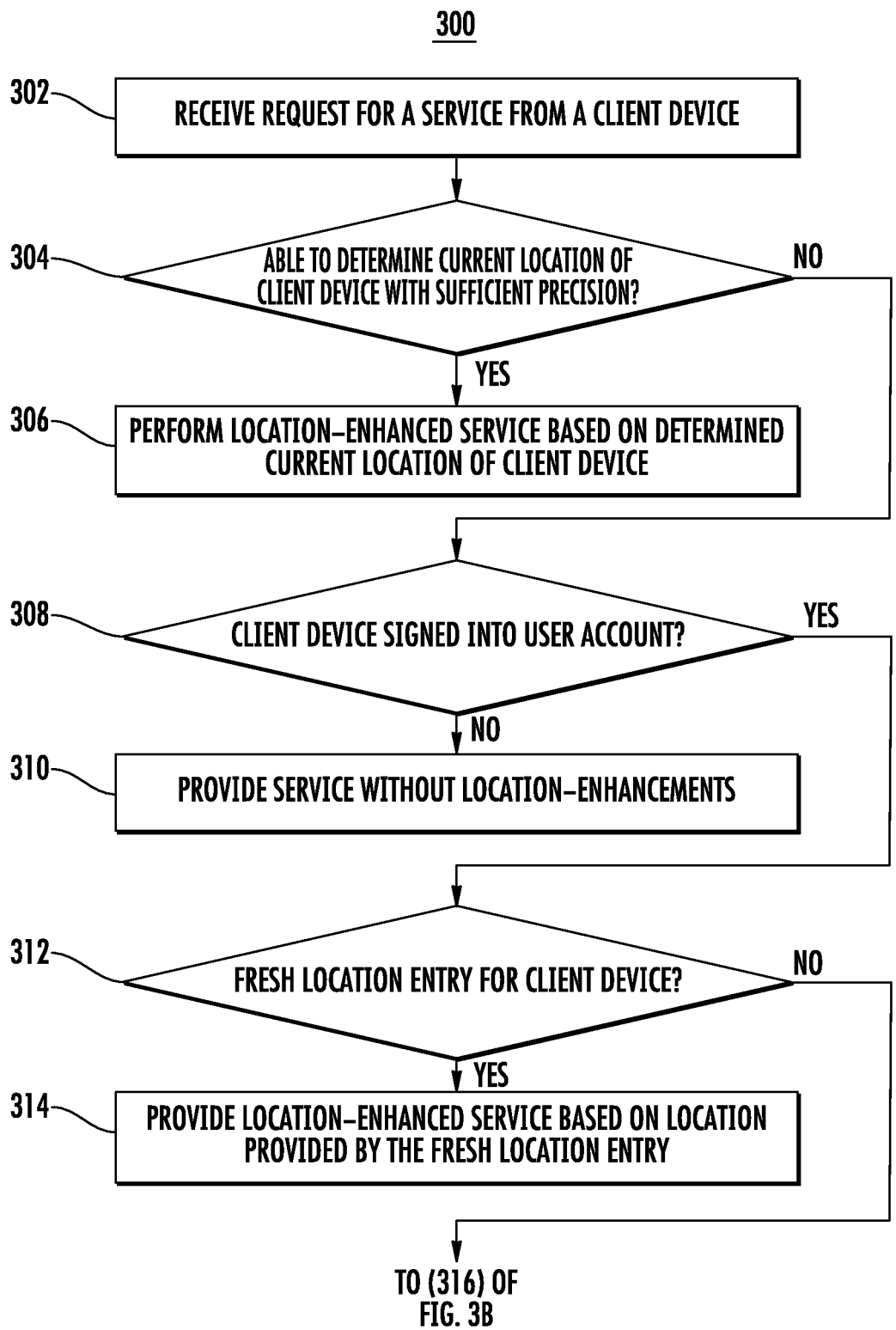
FIGS. 3A and 3B depict a flowchart of an example method for inferring a current location of a client device based on an analysis of a user location history according to an example embodiment of the present disclosure.
Figure 3B:
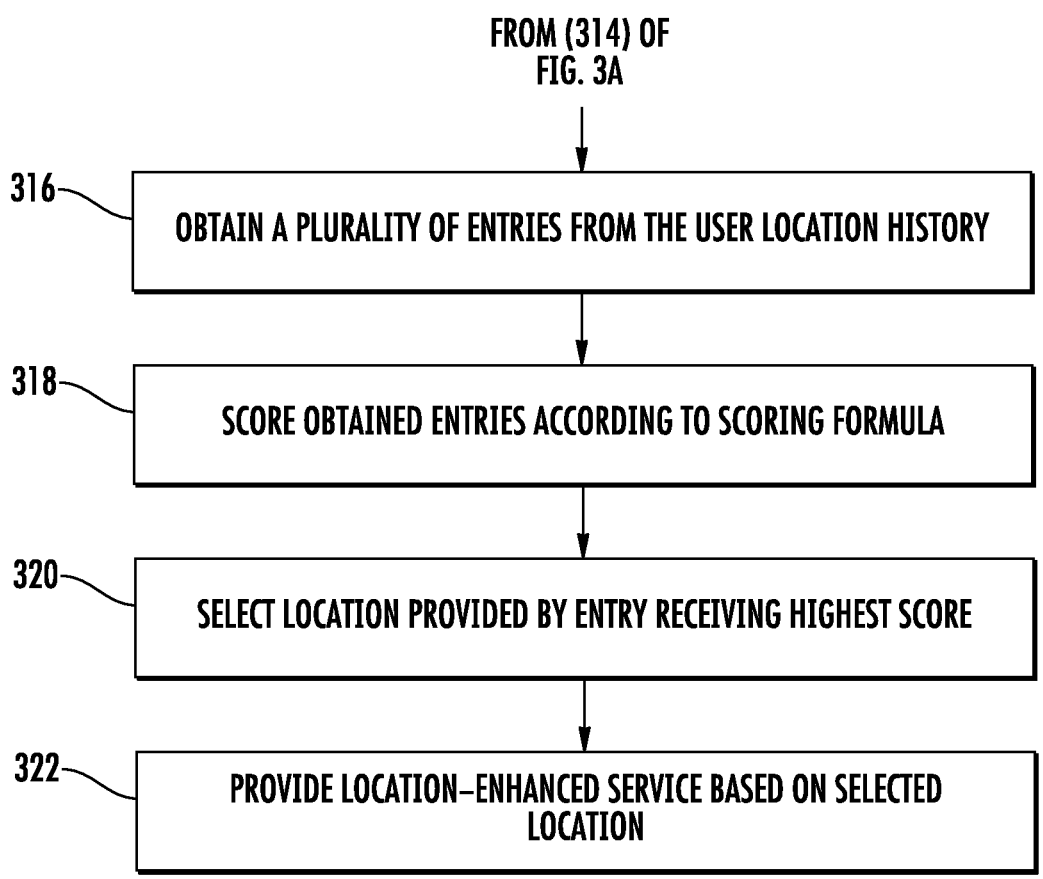

FIGS. 3A and 3B depict a flowchart of an example method (300) for inferring a current location of a client device based on an analysis of a user location history according to an example embodiment of the present disclosure.

While example method (300) will be discussed with reference to the system 200 of FIG. 2, method (300) can be implemented using any suitable computing system. In addition, although FIGS. 3A and 3B depict steps performed in a particular order for purposes of illustration and discussion, methods of the present disclosure are not limited to such particular order or arrangement. Various steps of the method (300) can be omitted, rearranged, combined, and/or adapted in various ways without deviating from the scope of the present disclosure.

Referring to FIG. 3A, at (302) a request for a service can be received from a client device. For example, host server can receive a request from client device 204 to provide point of interest search results in a mapping application. However, a desired location to search for points of interest may be ambiguous.

At (304) it is determined whether the current location of the client device is able to be determined with sufficient precision. As an example, positioning system 238 of client device 204 can operate to provide geolocation of client device 204 according to any known techniques, such as GPS. However, in some instances such geolocation techniques may not be available or otherwise fail to identify a particular location with sufficient precision.

As another example, the request received at (302) can include or otherwise be associated with an originating IP address. Geolocation based on such IP address can often be used to provide a general location for the client device. In addition, a confidence percentage can be obtained or computed.

If the current location of the client device is able to be determined with sufficient precision at (314), then method (300) can proceed to (306) and perform the requested location-enhanced service based on such determined current location of the client device. For example, host server 202 can utilize geographic information system 220 to provide location-specific point of interest search results.

However, if it is determined at (304) that the current location of the client device cannot be determined with sufficient precision, the method (300) can proceed to (308).

At (308) it can be determined whether the client device is currently signed into or otherwise presently associated with a user account. For example, session cookies or other indicators can be analyzed to determine and identify a presently active user account.

If it is determined at (308) that the client device is not currently signed into a user account, then at (310) the service can be provided without location-enhancements. For example, host server 202 might provide location-agnostic search results or might request a further narrowing of the target search location.

However, if it is determined at (308) that the client device is currently logged into an identifiable user account, then method (300) can proceed at (312).

At (312) it is determined whether a fresh location entry exists for the client device from which the request was received at (302). For example, host server 202 can analyze a user location history associated with the user account identified at (308) to obtain and analyze the most recent location entry associated with such client device (e.g. the most recent entry providing the device identifier associated with the client device from which the request was received at (302)).

Generally, the most recent entry for the client device will be considered fresh if it is within a threshold time from the current time. Thus, at (312) it can be determined that the most recent entry associated with the client device is fresh if it is less than, for example, five minutes old. However, other indicators of suitability can be analyzed in addition or alternatively to age, such as a confidence score or other metrics, including a comparison to a coarse location provided by IP geolocation.

If it is determined at (312) that a fresh entry exists for the client device, then at (314) the location-enhanced service can be provided based on the location denoted by such fresh location entry.

As an example, assume a smartphone is signed into a user account. A web search is performed on the smartphone at 2:04 PM, but a GPS update cannot be received. If the last location update for the smartphone stored in the user location history is in Palo Alto, Calif. at 2:00 PM, then such entry can be considered as fresh and the Palo Alto, Calif. location can be used to provide location-enhanced web search results.

However, if it is determined at (314) that a fresh location entry is not available for the client device, then method (300) can proceed to (316) of FIG. 3B.

Referring now to FIG. 3B, at (316) a plurality of entries included in the user location history can be obtained. For example, the most recent entry for each unique device identifier can be obtained. As another example, a particular number of the most recent entries regardless of device identifier can be obtained. As yet another example, a mix of entries can be obtained that includes the most recent entries in addition to at least one entry per unique device identifier. Host server 202 can obtain or otherwise access the appropriate location entries from the user location history stored in database 218.

At (318) each of the entries obtained at (316) can be scored according to a scoring formula. The scoring formula can score each entry on a number of criteria or parameters to provide a general indication of whether it is reasonable to use the location provided by the scored entry as the current location of the client device. In other words, for example, an entry that receives a higher score is more likely to provide a location that accurately corresponds to the current location of the client device.

As an example, the scoring formula used at (318) can provide a score to an entry based at least in part on such entry's age. A more recent location entry is more likely to accurately reflect the current location of the client device while an older location entry is less likely to accurately reflect the current location of the client device. Thus, for example, an age component of the scoring formula can decay over time. For example, a location entry that is over five days old should be scored very low as it is likely stale.

In other implementations, the age component of the scoring formula does not operate in units of time but rather analyzes a position of the entry being scored within the user location history. For example, if a device identifier has four associated historical location entries, the entry in the fourth position (e.g. oldest) would receive a lower score than the entry in the first position.

As another example, the scoring formula used at (318) can provide a score to the entry based at least in part on a location consistency with a coarse location obtained for the client device. For example, referring to FIG. 3A, at (304) a coarse location may have been able to be obtained for the client device, but such coarse location may not have had sufficient precision to be used at (306). As an example, IP geolocation could have been performed at (304) to obtain a coarse location (e.g. a state), but such coarse location was not sufficiently precise.

Thus, the scoring formula used at (318) can compare the location provided by the entry being scored with any coarse location previously determined for the client device. Matching locations will result in a higher score while contradicting locations will result in a lower score. A confidence value associated with either the coarse location or the location entry can influence the scoring formula as well. Thus, an entry that is older in time may still receive a higher score than an entry that is more recent if the older entry more accurately matches the coarse location.

As yet another example, the scoring formula used at (318) can provide a score to the entry based at least in part on a device co-location factor. In particular, the device co-location factor can provide an indication of how often the client device and the device identified by the entry being scored have historically been at the same place at the same time.

For example, a system implementing the present disclosure can compute a device co-location factor for each pair of device identifiers included in a user location history by comparing the historical locations and times provided by some or all entries associated with a first device identifier with the historical locations and times provided by some or all entries associated with a second device identifier. In one implementation, the device co-location factor can be generally proportional to a number of times that the two devices have been within a threshold distance of each other within a threshold amount of time. The device co-location factor for any pair of device identifiers can be computed ahead of time and stored in memory or can be computed by accessing some or all user location entries in real-time at (318).

If a user typically carries the first device and the second device together it is more reasonable to infer the location of the second device based on a historical location of the first device. Thus, the device co-location factor can provide an indication of how reasonable it is that a location entry for one device would be applied to a second device. For example, if a user carries their smartphone and tablet together a large percentage of the time, but has turned off the GPS in the smartphone to save battery life, it is likely reasonably accurate to infer the location of the tablet as the current location of the smartphone. However, if the two devices are routinely in different locations, then such inference is less likely to be accurate.

As another example, the scoring formula used at (318) can provide a score to the entry based at least in part on the method of geolocation by which the location provided by such entry was identifier. For example, an entry providing a location that was determined according to a more precise method of geolocation, such as, for example, GPS, can receive a higher score while an entry providing a location that was determined according to a less precise method of geolocation, such as, for example, IP geolocation or geolocation based on search string, can receive a lower score.

Other parameters or attributes of a historical location entry can be analyzed by a suitable scoring formula as well. In addition, the scoring parameters discussed above can be considered in isolation or in other combinations and are not necessarily used at a single time to provide a single score.

Furthermore, weightings, coefficients, or other components of the scoring formula can be trained against data having a known accuracy or categorization. As an example, one or more regression analyses can be performed with respect to a provided set of location data having known classifications as accurate or inaccurate.

After each of the obtained entries has been scored according to the scoring formula at (318), at (320) the location provided by the entry that received the highest score can be selected as the current location of the client device. At (322) the location-enhanced service can be provided based on the location selected at (320).

Thus, historical locations included in a user location history can be scored according to a scoring formula designed to identify the most appropriate replacement for an unknown or imprecise position of a client device. Therefore, a service provider will be able to routinely provide location-enhanced services despite being unable to determine a precise location of the client device using traditional geolocation techniques.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments and methods thereof, those skilled in the art, upon attaining an understanding of the foregoing may readily produce alterations to, variations of, and equivalents to such embodiments. For example, aspects of various embodiments disclosed above may be combined to produce yet further embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for determining a current location of a client device, the method comprising:
    determining, by the one or more computing devices, whether a time of a most recent entry of a user location history that identifies a first identifier associated with the client device is within a threshold time from a current time;
    when the time of the most recent entry at identifies the first identifier is within the threshold tune from the current time:
        selecting, by the one or more computing devices, as the current location of the client device, the location of the most recent entry that identifies the first identifier;
    when the time of the most recent entry that identifies the first identifier is not within the threshold time from the current time:
        obtaining, by one or more computing devices, a user location history having a plurality of entries, each entry identifying a location, a time, and one of a plurality of device identifiers associated with particular client devices;
        receiving, by the one or more computing devices, a request for a location-enhanced service from the client device;
        identifying, by the one or more computing devices for of the plurality of device identifiers, the entry having the most recent time;
        determining, by the one or more computing devices, a score for each of the identified entries using a scoring formula; and
        selecting, by the one or more computing devices, the location of the entry having the highest score as the current location of the client device.

2. The computer-implemented method of claim 1, wherein the scoring formula computes the score for each obtained entry based at least in part on an age of the entry, a location consistency, and a device co-location factor.

3. The computer-implemented method of claim 2, wherein the location consistency compares the location provided by the entry being scored with a coarse location associated with the client device.

4. The computer-implemented method of claim 3, wherein the coarse location associated with the client device is obtained by geolocation of an internet protocol address associated with the request received from the client device.

5. The computer-implemented method of claim 2, wherein the device co-location factor compares a first device location history associated with the device identifier provided by the entry being scored with a second device location history associated with the client device.

6. The computer-implemented method of claim 5, wherein the first device location history comprises the plurality of locations respectively provided by the plurality of entries that identify the device identifier provided by the entry being scored.

7. The computer-implemented method of claim 5, wherein the second device location history comprises the plurality of locations respectively provided by the plurality of entries that identify a first device identifier associated with the client device.

8. The computer-implemented method of claim 1, further comprising using, by the one or more computing devices, the selected location to provide the location-enhanced service to the client device.

9. One or more non-transitory computer-readable media storing instructions that, when executed by one or more processors, cause the one or more server processors to perform operations, the operations comprising:
   determining a score for each of a plurality of candidate locations each respectively associated with one of a plurality of device identifiers associated with a user account;
   selecting the candidate location having the highest score as a current location of a client device;
   wherein the score for each candidate location is based at least in part on a co-location factor exhibited between a pair of device location histories respectively associated with the client device and the device identifier associated with the candidate location being scored; and
   prior to determining the score for each of the plurality of candidate locations, receiving a request for a location-enhanced service from the client device; and
   after selecting the candidate location having the highest score as the current location of the client device, providing the location-enhanced service to the client device based at least in part on the current location of the client device.

10. The one or more non-transitory computer-readable media of claim 9, wherein the plurality of candidate locations respectively associated with the plurality of device identifiers associated with the user account are respectively specified by a plurality of entries in a user location history associated with the user account.

11. The one or more non-transitory computer-readable media of claim 10, wherein the plurality of entries in the user location history comprise a most recent entry associated with each of the plurality of device identifiers.

12. The one or more non-transitory computer-readable media of claim 9, wherein the co-location factor exhibited between the pair of device location histories respectively associated with the client device and the device identifier associated with the candidate location being scored describes an amount of time for which the client device and the device identified by the device identifier associated with the candidate location being scored are located within a threshold distance from each other.

* * * * *